United States Patent
Bryant et al.

(10) Patent No.: US 9,136,036 B2
(45) Date of Patent: Sep. 15, 2015

(54) INJECTION MOLDABLE, THERMOPLASTIC COMPOSITE MATERIALS

(75) Inventors: Edward W. S. Bryant, Winona, MN (US); Clifton P. Breay, Littleton, CO (US)

(73) Assignee: Miller Waster Mills, Winona, MN (US)

( * ) Notice: Subject to any disclaimer, the term of this patent is extended or adjusted under 35 U.S.C. 154(b) by 1211 days.

(21) Appl. No.: 12/166,782

(22) Filed: Jul. 2, 2008

(65) Prior Publication Data

US 2010/0003438 A1    Jan. 7, 2010

(51) Int. Cl.
  C08K 3/04     (2006.01)
  H01B 3/00     (2006.01)
  B82Y 30/00    (2011.01)
  C08J 5/00     (2006.01)
  C08K 7/14     (2006.01)
  C08K 7/24     (2006.01)
  C09C 1/44     (2006.01)
  (Continued)

(52) U.S. Cl.
  CPC ............ *H01B 3/004* (2013.01); *B82Y 30/00* (2013.01); *C08J 5/005* (2013.01); *C08K 3/04* (2013.01); *C08K 7/14* (2013.01); *C08K 7/24* (2013.01); *C09C 1/44* (2013.01); *H01B 3/427* (2013.01); *H01B 3/47* (2013.01); *C01P 2004/13* (2013.01); *C01P 2004/133* (2013.01); *C01P 2004/54* (2013.01); *C01P 2004/61* (2013.01); *C01P 2004/62* (2013.01); *C01P 2004/64* (2013.01); *C01P 2006/80* (2013.01); *Y10T 428/139* (2015.01); *Y10T 428/269* (2015.01)

(58) Field of Classification Search
  CPC .......... H01B 3/004; H01B 3/427; H01B 3/47; Y10T 428/139; Y10T 428/269; B82Y 30/00; C01P 2004/13; C01P 2004/133; C01P 2004/54; C01P 2004/61; C01P 2004/62; C01P 2004/64; C01P 2006/80; C08J 5/005; C08K 3/04; C08K 7/14; C08K 7/24; C09C 1/44
  USPC .................. 442/110, 111, 112, 179, 265, 349
  See application file for complete search history.

(56) References Cited

U.S. PATENT DOCUMENTS

| 4,654,747 A | 3/1987 | Covey |
| 4,902,444 A | 2/1990 | Kolouch |
| 4,933,178 A | 6/1990 | Capelli |

(Continued)

FOREIGN PATENT DOCUMENTS

| EP | 0 718 350 B1 | 6/1996 |
| EP | 1741549 A1 | 1/2007 |

(Continued)

OTHER PUBLICATIONS

U.S. Appl. No. 12/347,516, filed Dec. 31, 2008, Breay et al.

(Continued)

*Primary Examiner* — Jeremy R Pierce
(74) *Attorney, Agent, or Firm* — Foley & Lardner LLP

(57) ABSTRACT

A thermoplastic composite material, which includes a thermoplastic, organic polymer; and a plurality of carbon nanotubes, is provided. The thermoplastic composite material exhibits a bulk volume resistivity of about $10^3$ Ω-cm (ohm cm) to $10^{10}$ Ω-cm at 5,000 volts. Such thermoplastic composite materials may find utility in applications that require the thermoplastic to be capable of withstanding high voltage spikes, as would be encountered during a lightning strike.

7 Claims, 2 Drawing Sheets

(51) Int. Cl.
*H01B 3/42* (2006.01)
*H01B 3/47* (2006.01)

(56) References Cited

U.S. PATENT DOCUMENTS

| | | | |
|---|---|---|---|
| 4,971,268 | A | 11/1990 | Dobrowski et al. |
| 4,985,801 | A | 1/1991 | Hellard et al. |
| 5,000,875 | A | 3/1991 | Kolouch |
| 5,004,561 | A | 4/1991 | Nomura et al. |
| 5,049,684 | A | 9/1991 | Tomibe et al. |
| 5,093,409 | A | 3/1992 | Buckmaster |
| 5,114,190 | A | 5/1992 | Chalmers |
| 5,186,862 | A | 2/1993 | Krijger et al. |
| 5,280,979 | A | 1/1994 | Poli et al. |
| 5,326,947 | A | 7/1994 | Edds et al. |
| 5,498,644 | A | 3/1996 | Reo |
| 5,844,036 | A * | 12/1998 | Hughes .......................... 524/494 |
| 5,973,903 | A | 10/1999 | Tomerlin |
| 6,090,459 | A | 7/2000 | Jadamus et al. |
| 6,149,840 | A | 11/2000 | Ardakani et al. |
| 6,299,812 | B1 | 10/2001 | Newman et al. |
| 6,380,294 | B1 | 4/2002 | Babinec et al. |
| 6,521,144 | B2 | 2/2003 | Takezawa et al. |
| 6,582,628 | B2 | 6/2003 | Kondo et al. |
| 6,638,448 | B2 | 10/2003 | Karttunen et al. |
| 6,689,835 | B2 | 2/2004 | Amarasekera et al. |
| 6,848,720 | B2 | 2/2005 | Carns et al. |
| 6,909,015 | B2 | 6/2005 | Kemmish et al. |
| 6,919,394 | B2 | 7/2005 | Miyoshi et al. |
| 6,953,619 | B2 | 10/2005 | Dean et al. |
| 6,971,682 | B2 | 12/2005 | Hoang et al. |
| 6,998,434 | B2 | 2/2006 | Wadahara et al. |
| 7,001,556 | B1 | 2/2006 | Shambaugh |
| 7,026,388 | B2 | 4/2006 | Urata |
| 7,026,432 | B2 | 4/2006 | Charati et al. |
| 7,105,596 | B2 | 9/2006 | Smalley et al. |
| 7,141,183 | B2 | 11/2006 | Hattori et al. |
| 7,153,903 | B1 | 12/2006 | Barraza et al. |
| 7,160,980 | B2 | 1/2007 | Devine et al. |
| 7,204,940 | B2 | 4/2007 | McDonald et al. |
| 7,285,591 | B2 | 10/2007 | Winey et al. |
| 7,309,727 | B2 | 12/2007 | Elkovitch et al. |
| 7,342,765 | B2 | 3/2008 | Orgaz Villegas et al. |
| 7,354,988 | B2 | 4/2008 | Charati et al. |
| 7,493,911 | B2 | 2/2009 | Carns et al. |
| 7,686,344 | B2 | 3/2010 | Fernandez Vieira |
| 2002/0040124 | A1* | 4/2002 | Gharda et al. ................. 528/486 |
| 2002/0145285 | A1 | 10/2002 | Katayama et al. |
| 2002/0183438 | A1 | 12/2002 | Amarasekera et al. |
| 2003/0092824 | A1 | 5/2003 | Bastiaens et al. |
| 2003/0158323 | A1 | 8/2003 | Connell et al. |
| 2004/0026922 | A1 | 2/2004 | Carns et al. |
| 2004/0134553 | A1 | 7/2004 | Ichimura et al. |
| 2004/0135371 | A1 | 7/2004 | Masuda et al. |
| 2005/0070657 | A1* | 3/2005 | Elkovitch et al. ............. 524/495 |
| 2005/0186378 | A1 | 8/2005 | Bhatt |
| 2006/0069199 | A1 | 3/2006 | Charati et al. |
| 2006/0099843 | A1* | 5/2006 | Fullner et al. .................. 439/275 |
| 2006/0166003 | A1* | 7/2006 | Khabashesku et al. ........ 428/413 |
| 2007/0051406 | A1 | 3/2007 | Carns et al. |
| 2007/0145190 | A1 | 6/2007 | Villegas et al. |
| 2007/0172408 | A1 | 7/2007 | Takagi |
| 2007/0213450 | A1 | 9/2007 | Winey et al. |
| 2007/0232748 | A1 | 10/2007 | Guerret et al. |
| 2008/0013246 | A1 | 1/2008 | Berenguer Monge et al. |
| 2008/0015284 | A1 | 1/2008 | Cakmak et al. |
| 2009/0071676 | A1 | 3/2009 | Fernandez Vieira |
| 2009/0215344 | A1 | 8/2009 | Lashmore et al. |
| 2009/0227162 | A1 | 9/2009 | Kruckenberg et al. |
| 2010/0001512 | A1 | 1/2010 | Breay et al. |
| 2010/0003840 | A1 | 1/2010 | Breay et al. |
| 2010/0084616 | A1 | 4/2010 | Brule et al. |

FOREIGN PATENT DOCUMENTS

| | | |
|---|---|---|
| WO | WO 99/41304 A1 | 8/1999 |
| WO | WO 2006/049956 A1 | 5/2006 |
| WO | WO 2007/143237 A2 | 12/2007 |
| WO | WO 2008/047022 A1 | 4/2008 |
| WO | WO 2010/001238 A1 | 1/2010 |
| WO | WO 2010/044930 A2 | 4/2010 |

OTHER PUBLICATIONS

U.S. Appl. No. 12/166,698, filed Jul. 2, 2008, Breay et al.
International Search Report and Written Opinion for PCT/US2009/046542, mail date Jan. 21, 2010, 7 pages.
Peek, From *Wikipedia*, the free encyclopedia, Wikipedia definition, available at least by Jul. 1, 2008, (1 pg.).
RTP Co., The Global Leader in Specialty Compounding, "Innovation Bulletin, Carbon Nanotube Compounds", © 1995-2007 (5 pgs.).
RTP Co., The Global Leader in Specialty Compounding, "Case Studies: Conductive/Anti-Static Applications", © 1995-2007 (6 pgs.).
RTP Co., "Nanotube", Nanotube Compounds, Copyright RTP Company 2007, available at least by May 2007 (2 pgs.).
VICTREX® "PEEK™ Polymers"; http://victrex.com/en/peek-poly/peek-poly.php, available at least by Jul. 1, 2008 (8 pgs.).
VICTREX®, "High Performance Peek® Polymers", Materials Properties Guide, available at least by Apr. 8, 2008 (16 pgs.).
VICTREX®, "Passion—Innovation—Performance", Processing Guide, A comprehensive review of the processing guidelines of VICTREX® PEEK™ high performance polymer, available at least by Jun. 19, 2008 (21 pgs.).
Office Action for U.S. Appl. No. 12/166,698, date of mailing Sep. 24, 2010, 11 pages.
International Search Report for PCT/US2009/049515, date of mailing Jun. 4, 2010, 5 pages.

* cited by examiner

INJECTION MOLDABLE, THERMOPLASTIC COMPOSITE MATERIALS

FIELD OF THE INVENTION

The present invention is generally related to compositions for injection molding of thermoplastic composite materials and methods of preparation.

SUMMARY

The present application relates to thermoplastic composite materials, including composites which are capable of withstanding high voltage events and maintaining their resistivity properties. The materials commonly include thermoplastic, organic polymer, a plurality of carbon nanotubes and, optionally, plurality of carbon fibers. In certain embodiments, the present thermoplastic composite materials may nominally be insulators at low, applied potentials, but can exhibit mildly conductive properties at high potentials, such that the material can allow for the dissipation of an electrostatic charge. The thermoplastic composite materials commonly exhibit a bulk volume resistivity of about $10^3$ Ω-cm (ohm cm) to $10^{10}$ Ω-cm at 5,000 volts. Such thermoplastic composite materials may find utility in applications that require the thermoplastic composite to be capable of withstanding high voltage spikes, as would be encountered during a lightning strike. The thermoplastic, organic polymer used to form the composite materials may desirably have a viscosity of about 800 to 1,500 poise as measured at 380° C. and a shear rate of 1000 sec$^{-1}$.

In a first aspect, a thermoplastic composite material is provided. In such embodiments, the composite material has a thermoplastic, organic polymer; and a plurality of carbon nanotubes. In such embodiments, the thermoplastic composite material exhibits a bulk volume resistivity of about $10^3$ Ω-cm to $10^{10}$ Ω-cm at 5,000 volts DC ("VDC").

In other embodiments, the composite material exhibits a bulk volume resistivity of at least about $10^6$ Ω-cm at 100 VDC. At 100 VDC, the composite may have a bulk volume resistivity of at least about $10^9$ Ω-cm. In yet other embodiments, the composite material exhibits a bulk volume resistivity of from about $10^6$ Ω-cm to $10^{10}$ Ω-cm at 5000 VDC.

In some embodiments, the composite material exhibits a bulk volume resistivity degradation of no more than a 20× factor. In other embodiments, the bulk volume resistivity degradation is no more than a 15× factor or, in certain embodiments, no more than a 10× factor. In other embodiments, the thermoplastic composite material exhibits a five-strike bulk volume resistivity degradation of no more than a factor of 50% at a relatively high voltage, e.g., at 5,000 volts.

In some embodiments, the thermoplastic, organic polymer is a polyalkylene terephthalate, polyalkyleneterephthalate glycol, polyetheretherketone, polycarbonate, polyphenylene sulfide, polyetherimide, or a blend of any two or more such materials. For example, the polymer may be polyetheretherketone, polycarbonate, polybutylene terephthalate, polyethyleneterephthalate glycol, polyphenylene sulfide, polyetherimide, or a blend of any two or more such materials. Another such polymer that may be suitable is an aromatic polyetheretherketone such as 4-(4-phenoxyphenoxy)benzoyl polyetheretherketone. Examples of suitable polyalkylene terephthalates include polybutylene terephthalate, polypropyleneterephthalate, polyethyleneterephthalate and mixtures thereof. Examples of suitable polyalkylene terephthalate glycols include polybutylene terephthalate glycol, polyethyleneterephthalate glycol, polypropyleneterephthalate glycol and mixtures thereof.

In some embodiments, about 0.05 wt % to 2 wt % of the carbon nanotubes are present in the thermoplastic composite materials and, commonly, 0.2 wt % to 0.5 wt %. In some embodiments, the composites also contain glass fiber, carbon fiber, or a combination thereof.

In another aspect, a thermoplastic composite material is provided that includes a thermoplastic, organic polymer; a plurality of carbon nanotubes; a plurality of carbon fibers; and a plurality of glass fibers; where the thermoplastic composite material exhibits a bulk volume resistivity of about $10^3$ Ω-cm to $10^{10}$ Ω-cm at 5,000 VDC. Some such composites may exhibit a bulk volume resistivity degradation of no more than a 20× factor at 5,000 VDC. Such materials may also exhibit a bulk volume resistivity of at least about $10^6$ Ω-cm at 100 VDC.

DETAILED DESCRIPTION

Figure 1:
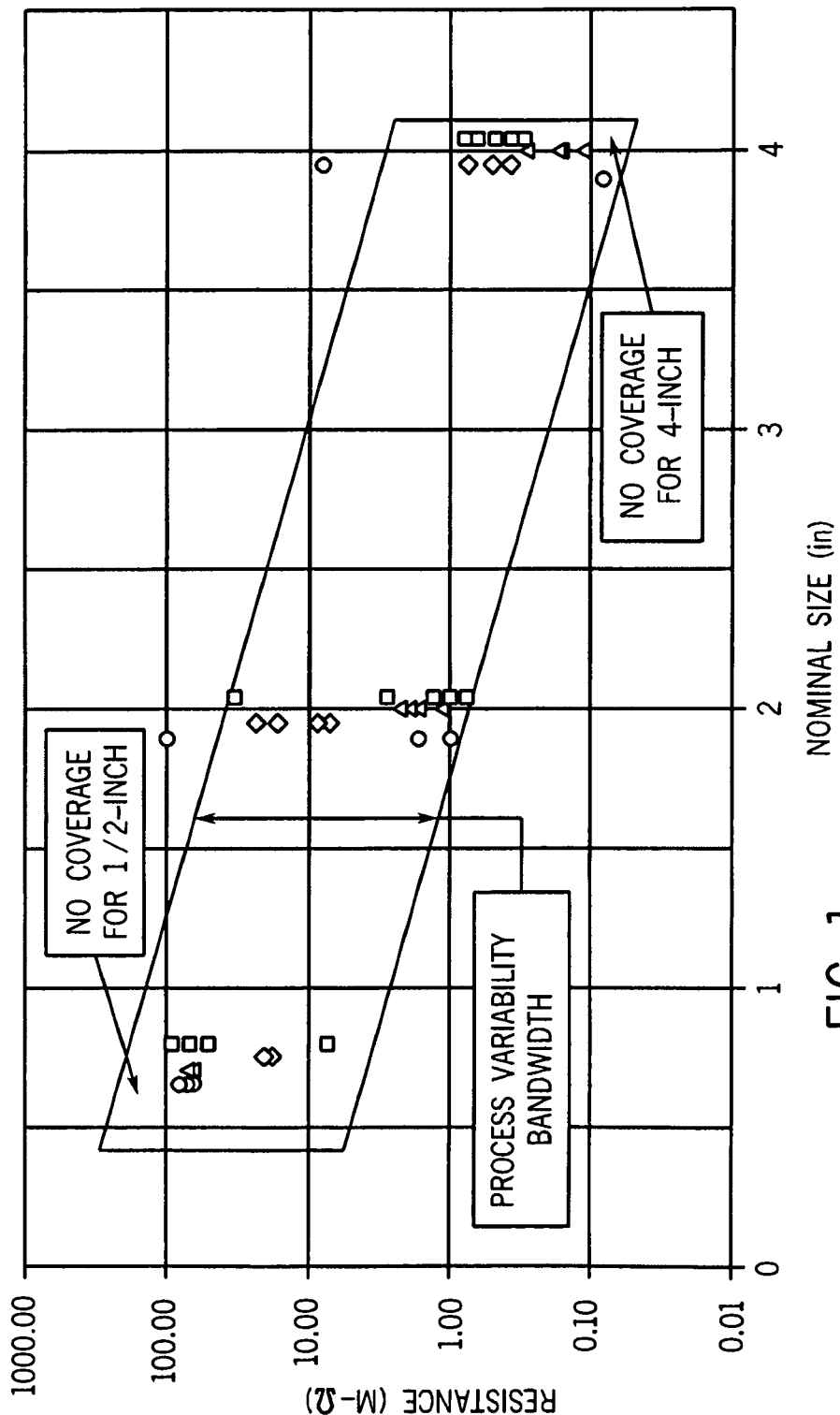
FIG. 1 is a graph of electrical resistance (y-axis) vs. tube diameter size (x-axis) for pre-lightning strike testing of an exemplary tube composition.

Thermoplastic composite materials are provided that may exhibit unique electrical properties in response to large voltage changes. Such composites may nominally be insulators at no, or low, applied potentials, but become mildly conductive at high potentials such that the material allows for the dissipation of an electrostatic charge. Such composites can find utility in a variety of applications. For example, the composites may be used to prepare dielectric fittings or isolator. Such dielectric fitting or isolators may be used in applications that are susceptible to lightning strikes, large voltage pulses associated with hybrid electric vehicles, or electric substations. Such compositions are commonly amenable to a variety of processing methods including machining, injection molding, compression molding, extruding, and/or forming.

Dielectric fittings or isolators are known in the art and have found use in many applications, ranging from natural gas pipelines, where they isolate monitoring instruments from the effects of electrical current and interrupt cathodic current flow while permitting fluid flow, to providing a conduit for transferring liquid through selected locations as required or aircraft bulkhead structures. In the latter usage, the dielectric fitting contains integral fitting connections on both sides of the aircraft bulkhead that permit connections of tubes, hoses, or other fluid-carrying components. Such a dielectric fitting also provides a high electrical resistance path that limits electrical current flow between the two fitting connections, but allows for the gradual dissipation of electrostatic charge.

Thus, the primary functions of a dielectric fitting, also referred to as a static dissipative isolator, is to dissipate the electrical energy from static charges caused, in part, by fluid movements and to limit electrical current flow caused by the indirect effects of lightning, at such an occurrence. These fittings have the equally important secondary function of providing a safe fluid passage for the fluid passing through the fuel tank or other areas of the aircraft.

In one exemplary application, such composites may find utility in the aerospace industry in a lightning strike arrestor in aircraft fuel lines. A lightning strike arrestor is a safety device in an aircraft fuel line that is used to safely control the electrical pulse encountered during a lightning strike event on an aircraft. Currently, lightning strike arrestors are typically made using thermoset materials that are often quite costly and laborious to produce. Such arrestors are entirely filament-wound by hand in a laborious and time-consuming process, and the materials are not amenable to injection molding production methods.

In one embodiment, a thermoplastic composite material is provided. The thermoplastic composite material may include materials such as a thermoplastic, organic polymer, a plurality of carbon nanotubes, and, optionally, a plurality of carbon fibers. In order to accommodate high voltage events, such thermoplastic composite materials exhibit a bulk volume resistivity of about $10^3$ Ω-cm to $10^{10}$ Ω-cm at 5,000 VDC. Other voltages such as 1,000 VDC or 10,000 VDC may also be used, and the corresponding resistivity determined, however the resistivity should preferably be in the dissipating to insulating range, as described below.

Thermoplastic composites, subjected to high voltages, tend to suffer degradation in their resistivity properties over time, in as little as one cycle to high voltage, or even during the ramp to a high voltage. Thus, the present materials are desirably capable of withstanding high voltage events and maintaining their resistivity properties. The phrase "bulk volume resistivity degradation," is used to refer to one measure of the overall degradation in resistivity due to high voltage events.

The bulk volume resistivity degradation of a composite material is determined at a specified voltage (e.g. 100 VDC, 500 VDC, 1000 VDC, 5000 VDC, or other predetermined voltage), after a specified number of cycles. Such resistivity changes may be referred to as a five-strike bulk volume resistivity degradation, where five is the specified number of cycles. For example, a five-strike bulk volume resistivity degradation at 5,000 VDC would be determined by subjecting the material to cycling between zero and 5000 VDC for five cycles, and measuring the resistivity at 5000 VDC during the first and fifth cycles. Desirably, the present thermoplastic composite materials exhibits a five-strike bulk volume resistivity degradation of no more than a 20× factor after being cycled between zero and the specified voltage, e.g., 5,000 volts. In some embodiments, the composite materials exhibit a five-strike bulk volume resistivity degradation of no more than a 15×, 10×, or even a 5× factor after being cycled between zero and the specified voltage. For example, if the maximum degradation is a 20× factor and the initial determination at the specified voltage is a bulk volume resistivity of $6 \times 10^8$ Ω-cm, the bulk volume resistivity would be no less than $3 \times 10^7$ Ω-cm at the fifth cycle. In other embodiments, the present composite materials may exhibit a five-strike bulk volume resistivity degradation of no more than 50% after being cycled between zero and the specified voltage, e.g., after being cycled five (5) times between zero and 5,000 volts. In some embodiments, the present thermoplastic composite materials exhibit a five-strike bulk volume resistivity degradation of no more than a 25%, 10%, 5%, or even as low as a 2% after being cycled between zero and the specified voltage, e.g., 5,000 volts. For example, when the thermoplastic composite material exhibits a maximum degradation in its five-strike bulk volume resistivity degradation of no more than a factor of 50%, if the initial determination at the specified voltage is a bulk volume resistivity of $6 \times 10^8$ Ω-cm, the bulk volume resistivity would be no less than $3 \times 10^8$ Ω-cm at the fifth cycle; correspondingly for a maximum degradation of 25%, the bulk volume resistivity would be no less than $4.5 \times 10^8$ Ω-cm at the fifth cycle.

As used herein, volume resistivity is the resistance (ohm cm) to leakage current through the body of an insulating material. As used herein, surface resistivity (ohms per square) is defined as the resistance to leakage current along the surface of an insulating material. As the surface/volume resistivity increases, the leakage current and conductivity of the material decrease.

As a reference point for volume resistivity, conductive materials such as metals are those materials having a volume resistivity of less than $1 \times 10^{-4}$ Ω-cm. In conductive materials, charges go to ground or to another conductive object that the material is in close proximity to, or contacts. Electrostatic shielding materials have a conductive layer with a volume resistivity of less than $1 \times 10^3$ Ω-cm, but greater than or equal to $1 \times 10^{-4}$ Ω-cm. Dissipative materials have a volume resistivity of from about $1 \times 10^3$ Ω-cm to $1 \times 10^{10}$ Ω-cm. For these materials, the charges flow to ground more slowly and in a somewhat more controlled manner than with conductive materials. For ESD-sensitive (electrostatic discharge) devices, these materials provide Faraday cage protection from energy transfer. Insulator materials are defined as those having a volume resistivity of at least $1 \times 10^{10}$ Ω-cm. Insulative materials prevent or limit the flow of electrons across their surface or through their volume, have a high electrical resistance, and are difficult to ground. Static charges remain in place on insulative materials for an extended period of time. Table 1 summarizes the commonly accepted values for volume and surface resistivities for the various categories of materials discussed above.

TABLE 1

Volume and Surface Resistivities for Material Types.

| Material Type | Surface Resistivity (Ω/sq) | Volume Resistivity (Ω-cm) |
| --- | --- | --- |
| Conductive | $<1 \times 10^{-4}$ | $<1 \times 10^{-4}$ |
| Electrostatic shielding | $\geq 1 \times 10^{-4}, <1 \times 10^4$ | $\geq 1 \times 10^{-4}, <1 \times 10^3$ |
| Dissipative | $\geq 1 \times 10^6, <1 \times 10^{11}$ | $\geq 1 \times 10^3, <1 \times 10^{10}$ |
| Insulative | $\geq 1 \times 10^{11}$ | $\geq 1 \times 10^{10}$ |

As indicated above by the strike resistivity degradation values, the present thermoplastic composites preferably do not exhibit electrical "burn-in," or at least exhibit a substantially reduced "burn-in" as compared to other materials. "Burn in" refers to a phenomenon where materials, once exposed to a high voltage, do not return to their initial electrical resistance, but instead exhibit a reduced resistance. Compounds formulated without the CNTs tend to display such a "burn in" phenomenon. However, surprisingly, the present composites containing CNTs, eliminate, or at least substantially reduce, such "burn in." Without being bound by theory, it is believed that composites without CNTs, or with high CNT loadings, are susceptible to material degradation and ionization when exposed to high voltages. Whereas, in the present thermoplastic composite materials, the CNTs provide an electrical conduit through the polymer matrix, when the compositions are exposed to a high voltage, such that ionization and degradation of the polymer matrix are avoided or at least substantially reduced. In other words, at high applied potentials, the thermoplastic composite materials act as electrostatic dissipaters that allow a controlled release of a static charge build-up, thereby preventing, or at least substantially reducing arcing or rapid discharge. Eliminating or substantially reducing the potential for generation of a spark from the composites or the materials to which they are in contact, helps to reduce the risks for harm to the surrounding environment and people in close proximity to such a charge.

With respect to lightning strike performance requirements, in one specific embodiment, an dielectric isolator prepared from the present thermoplastic composite material, should desirably not exhibit electrical arcing or sparking, either internally or externally, or voltage/current waveform collapse during and after exposure to multiple voltage pulses (e.g., at least six and, in some instances, between ten and thirty), in either (+/−) polarity, having peak amplitude of 9000 volts that conform to voltage waveform B in accordance with SAE ARP5412. Such measurements may be conducted on a dielectric isolator which includes a tube of the thermoplastic composite material, having a diameter of 2 inches and a length of 5.4 inches, which has an electrical resistivity of from about $10^5 \Omega$ to $108\Omega$ at 500 VDC.

The thermoplastic composite materials are prepared from a polymer and carbon nanotubes. As noted above, the composites are insulators at low applied potentials, but are mildly conductive, i.e. the materials become dissipative, at high applied potentials. Thus, in one embodiment, by utilizing ASTM D-257, the compositions are determined to be insulators. As such, at an applied potential of 100 volts, the compositions exhibit a volume resistivity of greater than or equal to $10^9$ $\Omega$-cm and, more typically, at least about $10^{10}$ $\Omega$-cm. However, in other embodiments, the composites, at potentials of 1000 volts, or greater, exhibit a volume resistivity of $10^3$ $\Omega$-cm to $10^{10}$ $\Omega$-cm. The use of the standard protocol and specimen size with voltages higher than 100 volts, for example, over 1000 volts, are referred to as a "modified ASTM D-257 protocol." In one embodiment, a modified ASTM D-257 protocol results in the measurement of the bulk volume resistivity of the composite material at 5000 volts. The present thermoplastic composites desirably exhibit a bulk volume resistivity of about $10^6$ $\Omega$-cm to $10^{10}$ $\Omega$-cm at 5000 volts.

ASTM D-257 is a standardized method for determining surface and volume resistivity of a material. Briefly, according to the method, a standard size specimen is placed between two electrodes, and a voltage is then applied for sixty seconds and the resistance is measured. Surface or volume resistivity is calculated, and apparent value is given for the sixty second electrification time. The method is well known and the full standard is available from ASTM International, West Conshohocken, Pa. As shown below in the Examples, shape and size of a device prepared from the thermoplastic composite materials affects the resistance properties of the device. Thus, in some embodiments, the shape of the device, for evaluation purposes, is a flame bar shape having dimensions of 6"×0.5"× 0.125". In other embodiments, the test specimens are cylindrical tubes having a diameter of 0.75 inches, 2 inches, or 4 inches, and a length of 5.4". Such test sizes may be indicative of the properties of devices to be used in the field, thus the device formed from the thermoplastic composite material is not so limited. In one embodiment, a tube of the thermocomposite material, having a diameter of 2 inches and a length of 5.4 inches, has an electrical resistivity of from about $10^5 \Omega$ to $10^8 \Omega$ at 500 VDC.

Suitable polymers include, those thermoplastics the are typically used in injection molding applications. For example, such polymers, include, but are not limited to polyacetal, polyacrylic, polyalkylene terephthalate, polyalkylene terephthalate glycol, polycarbonate, polystyrene, polyester, polyamide, polyamideimide, polyarylate, polyarylsulfone, polyethersulfone, polyphenylene sulfide, polyvinyl chloride, polysulfone, polyimide, polyetherimide, polytetrafluoroethylene, polyetherketone, polyetheretherketone, polyetherketoneketone, polybenzoxazole, polyoxadiazole, polybenzothiazinophenothiazine, polybenzothiazole, polypyrazinoquinoxaline, polypyromellitimide, polyquinoxaline, polybenzimidazole, polyoxindole, polyoxoisoindoline, polydioxoisoindoline, polytriazine, polypyridazine, polypiperazine, polypyridine, polypiperidine, polytriazole, polypyrazole, polypyrrolidine, polycarborane, polyoxabicyclononane, polydibenzofuran, polyphthalide, polyacetal, polyanhydride, polyvinyl ether, polyvinyl thioether, polyvinyl alcohol, polyvinyl ketone, polyvinyl halide, polyvinyl nitrile, polyvinyl ester, polysulfonate, polysulfide, polythioester, polysulfone, polysulfonamide, polyurea, polyphosphazene, polysilazane, or a blend of any two or more.

In some embodiments, the thermoplastic, organic polymer is a polyetheretherketone, polycarbonate, polybutylene terephthalate, polyethyleneterephthalate glycol, polyphenylene sulfide, polyetherimide, or a blend of any two or more thereof. In other embodiments, the thermoplastic polymer is a polyetheretherketone. Polyetheretherketones and other polyetherketones or polyetherketoneketones are described in patents such as EP 0 001 879, U.S. Pat. No. 6,909,015, and U.S. Pat. No. 6,274,770. The thermoplastic polymer may be present in the composite from about 50 wt % to 98 wt % in some embodiments, from about 55 wt % to 95 wt % in other embodiments, or from about 60 wt % to 90 wt % in yet other embodiments. One example of a thermoplastic, organic polymer that is suitable for use in the present composite materials is a low viscosity grade polyetherether-ketone, which has a viscosity of about 800 to 1,200 poise as measured at 380° C. and a shear rate of 1000 sec$^{-1}$.

Without be bound to a single example, one such thermoplastic, organic polymer that may be used in the present composites embodied herein is a polyetheretherketone, which includes oxy-1,4-phenylene-oxy-1,4-phenylene-carbonyl-1,4-phenylene repeat units. A suitable example of this polymer is commercially available from Victrex® USA, Inc. West Conshohocken, Pa., as PEEK™ 150 P polymer. This material, which is commercially available as a powder, is a low viscosity grade of PEEK™ polymer for use in extrusion compounding and has a viscosity of about 1,000 poise when measured at 380° C. and a shear rate of 1000 sec$^{-1}$. PEEK™ polymer is commercially available from Victrex® USA in a number of other grades and forms ranging from low medium and standard viscosity grades to easy flow and general purpose grades. Various grades of PEEK™ polymer are known and all are flame resistant, and insulative. PEEK™ polymer also exhibits wear resistance, low friction, and good chemical resistance, particularly to various fuels and other hydrocarbons. Aromatic polyetheretherketones, such as 4-(4-(4-oxyphenoxy)-phenoxy)-benzoyl polyetheretherketone, may typically be processed via extrusion or injection molding at polymer temperatures of about 360° C. to 400° C.

Carbon nanotubes, suitable for use in the composites, include both multi-wall and single wall nanotubes. Carbon nanotubes may be prepared using a variety of techniques, including, but not limited to, arc discharge, laser ablation, high pressure carbon monoxide (HiPCO), chemical vapor deposition (CVD), and catalytic chemical vapor deposition (CCVD). Such techniques may utilize vacuum techniques or processing gases. Carbon nanotubes can be of a wide variety of sizes. Single-walled carbon nanotubes have a shape that is reminiscent of a tube made by rolling a sheet of paper one time such that opposites sides of the sheet meet and abut one another. Whereas multi-walled tubes have a shape that is reminiscent of a scrolled sheet of paper, or chicken wire, that is rolled multiple times. The inner core region of the carbon nanotube may be hollow, or may comprise carbon atoms which are less ordered than the ordered carbon atoms of the outer region. As used herein, the phrase "ordered carbon atoms," refers to graphitic domains having their c-axes substantially perpendicular to the cylindrical axis of the carbon nanotube. The individual graphitic carbon layers are concentrically arranged around the long axis of the fiber like the growth rings of a tree, or like a scroll of hexagonal chicken wire. There is usually a hollow core a few nanometers in diameter, which may be partially or wholly filled with less organized carbon. Each carbon layer around the core may extend as much as several hundred nanometers. The spacing between adjacent layers may be determined by high resolution electron microscopy, and in some embodiments is only slightly greater than the spacing observed in single crystal graphite, i.e., about 0.339 to 0.348 nanometers.

The term carbon nanotubes refers to an essentially cylindrical, discrete carbon tube, on the nanometer scale. Single-walled carbon nanotubes typically have a substantially constant diameter between about 2 nm and 100 nm. For example, from about 3 nm to 75 nm, from about 4 nm to 50 nm, from about 4 nm to 25 nm, or from about 5 nm to 15 nm, according to various embodiments. In one embodiment, the carbon nanotubes have a diameter from about 3.5 nm to 70 nm. The length of the carbon nanotubes may also vary and may cover a range from hundreds of nanometers to the micron range. Typically, the length of a carbon nanotube is greater than about 100 times the diameter. For example, carbon nanotubes may have a length from about 100 nm to 10 µm, from about 500 nm to 5 µm, from about 750 nm to 5 µm, from about 1 µm to 5 µm, or from about 1 µm to 2 µm, according to various embodiments. An outer region of single-walled or multi-walled nanotubes is made of essentially continuous layers of ordered carbon atoms and a distinct inner core region. In multi-walled tubes each of the layers and core is disposed substantially concentrically about the cylindrical axis of the carbon nanotube. Preferably the entire carbon nanotube is substantially free of thermal carbon overcoat.

As used herein, the term "cylindrical" is used herein in the broad geometrical sense, i.e., the surface traced by a straight line moving parallel to a fixed straight line and intersecting a curve. A circle or an ellipse are but two of the many possible curves of the cylinder.

The purity of the carbon nanotubes may also play a role in the effectiveness of the nanotubes in the thermoplastic composites. The carbon nanotubes may have a purity of greater than 50%, in some embodiments, of greater than 60%, in some embodiments, of greater than 70%, in some embodiments, of greater than 80%, in some embodiments, or of greater than 90%, in still other embodiments. Typically, the carbon nanotubes, due to manufacturing methods, contain metal oxide impurities. While the metal oxide impurities may or may not affect thermoplastic composite performance in some embodiments, the metal oxide content of the carbon nanotubes is less than 50%. In other embodiments, the metal oxide content of the carbon nanotubes is less than 60%, less than 40%, less than 30%, or less than 20%. In still other embodiments, the carbon nanotubes have less than 10% metal oxide impurities.

The carbon nanotubes may be present in the thermoplastic composites from about 0.05 wt % to 2 wt %, in some embodiments, from about 0.1 wt % to 1 wt %, in other embodiments, or from about 0.2 wt % to 0.5 wt %, in yet other embodiments. In some embodiments, the thermoplastic composites have from about 0.2 wt % to 0.4 wt %, or from about 0.25 wt % to 0.35 wt %.

The thermoplastic composite materials may contain a variety other materials that may impact a variety of properties. For example, in some embodiments, the composites include materials such as glass fiber to provide rigidity and strength to parts or devices prepared from the compositions. In some embodiments, the glass fiber is present in the composites from 0 wt % to about 60 wt %, from about 5 wt % to 60 wt % in other embodiments, or from about 15 wt % to 40 wt %, in yet other embodiments.

As another example, the composites may include carbon materials such as graphite, carbon black, carbon fiber and/or milled carbon fiber as another conductor in addition to the carbon nanotubes. In some embodiments, the graphite, carbon black, carbon fiber and/or milled carbon fiber is present in the composites from 0 wt % to about 20 wt %, from about 1 wt % to 10 wt % in other embodiments, or from about 4 wt % to 12 wt %, in yet other embodiments. The length of the carbon fibers may vary widely. In some embodiments, the average length of the milled carbon fibers is no more than about 0.5 mm and, desirably, no more than about 0.3 mm. In some embodiments, the average length of the milled carbon fibers is no more than about 0.2 mm.

The thermoplastic composite materials provided herein are amenable to injection molding processes. After compounding of the composite, the thermoplastic composite material extrudate exits the extruder as a spaghetti-like material that is cooled and cut into small pieces for ease of handling, quick packaging and/or convenient shipping. Alternatively, bulk material could be extruded and used in a bulk process. An injection molding apparatus may then be charged with the extrudate and molded into parts or devices that may be used as is, or require additional machining to refine the device into a useable part. For example, tubing, connectors, threaded connectors, etc. may be prepared by injection molding processes.

Methods of preparing the composites are also provided. Methods may include blending all ingredients that will form the thermoplastic composite material in a hopper and extruding the mixture. Alternatively, the methods may include several steps with the various ingredients being added at any given point in the process. For example, a first amount of a thermoplastic polymer may be compounded with carbon nanotubes in an extruder to produce a first extrudate. The first extrudate may then be blended with glass fiber, carbon fiber, and/or milled carbon fiber and subjected to a second extrusion to produce a second extrudate that is a thermoplastic composite material. Compounding may take place in a single screw, twin screw, or other style extruder. The methods may also include tumbling all the ingredients of any particular stage of the preparation, prior to being fed to the extruder.

In preparing the composites, the same thermoplastic polymer may be used in the preparation of both the first and second extrudates, or different thermoplastic polymers may be used. If different thermoplastic polymers are used in the steps, they may be chemically distinct polymers, or just different grades of the same polymer having varying viscosities, melt indices, or other polymeric properties.

The present invention, thus generally described, will be understood more readily by reference to the following examples, which are provided by way of illustration and are not intended to be limiting of the present invention.

EXPERIMENTAL

Materials. CF is an abbreviation for carbon fiber, and MCF is an abbreviation for milled carbon fiber, prepared by milling the CF. The CF used in the following tables is Tenax 303 available from Toho Tenax, Rockwood, Tenn. GF is an abbreviation for glass fiber. The GF used in the following is Vetrotex EC 10, available from Owens Corning, Toledo, Ohio. PEEK™ polymer is an abbreviation for a polyetheretherketone, which includes oxy-1,4-phenylene-oxy-1,4-phenylenecarbonyl-1,4-phenylene repeat units. The PEEK™ polymer used in the following tables is Victrex® 150 P PEEK™ polymer, available from Victrex USA, West Conshohocken, Pa. CNT is an abbreviation for carbon nanotubes. The CNT used in the following tables was Nanocyl 7000, available from Nanocyl, Inc.

Each of the examples is a ladder study to determine the impact of the individual components of the compositions. Extruded compositions were prepared by compounding the PEEK with the CNT in a twin screw extruder to form a master batch of 10 wt % CNT in PEEK (MB CNT). The master batch was then further compounded with additional PEEK, and also the CF and the GF in a single-screw extruder. After extrusion and cooling, the compounded materials, were cut to appropriate dimensions.

Comparative Example 1

MCF and GF Constant

| Sample | PEEK (%) | MB CNT (%) | MCF (%) | GF (%) |
|---|---|---|---|---|
| 1 | 43 | 2.0 | 12 | 25 |
| 2 | 38 | 2.5 | 12 | 25 |
| 3 | 33 | 3.0 | 12 | 25 |
| 4 | 28 | 3.5 | 12 | 25 |
| 5 | 23 | 4.0 | 12 | 25 |
| 6 | 18 | 4.5 | 12 | 25 |

Comparative Example 2

CNT and GF Constant

| Sample | PEEK (%) | MB CNT (%) | MCF (%) | GF (%) |
|---|---|---|---|---|
| 7 | 60 | 5 | 10 | 25 |
| 8 | 62 | 5 | 8 | 25 |
| 9 | 64 | 5 | 6 | 25 |
| 10 | 66 | 5 | 4 | 25 |

Example 1

GF Constant

| Sample | PEEK (%) | MB CNT (%) | MCF (%) | GF (%) |
|---|---|---|---|---|
| 11 | 67 | 5 | 3 | 25 |
| 12 | 68 | 5 | 2 | 25 |
| 13 | 65.5 | 3.5 | 6 | 25 |
| 14 | 67.5 | 3.5 | 4 | 25 |
| 15 | 68.5 | 3.5 | 3 | 25 |
| 16 | 69.5 | 3.5 | 2 | 25 |

Example 2

GF, MCF and PEEK Constant

| Sample | PEEK (%) | MB CNT (%) | MCF (%) | GF (%) |
|---|---|---|---|---|
| 26 | 67.3 | 3.7 | 4 | 25 |
| 27 | 67.5 | 3.5 | 4 | 25 |
| 28 | 67.7 | 3.3 | 4 | 25 |
| 29 | 67.9 | 3.1 | 4 | 25 |
| 30 | 68.1 | 2.9 | 4 | 25 |
| 31 | 68.3 | 2.7 | 4 | 25 |

Example 3

Measure of Volume Resistivities

The volume resistivity for a number of samples is shown in the table below. The reported value are for determinations made without any cycling between zero and the indicated voltage (i.e., "after one (1) cycle).

| Sample | Vol. Resistivity at 500 V ($\Omega$-cm) | Vol. Resistivity at 1000 V ($\Omega$-cm) | Vol. Resistivity at 5000 V ($\Omega$-cm) |
|---|---|---|---|
| 11 | 1.923E+06 | 5.123E+07 | TC |
| 12 | NR/I | 1.775E+06 | TC |
| 13 | NR/I | NR/I | 5.00E+08 |
| 14 | NR/I | NR/I | 7.58E+08 |
| 15 | NR/I | NR/I | NR/I |
| 16 | NR/I | NR/I | NR/I |
| 26 | 2.79E+05 | 1.76E+05 | 2.92E+04 |
| 27 | 1.69E+06 | 8.98E+05 | 1.07E+05 |
| 28 | 7.81E+08 | 5.21E+08 | 2.73E+07 |
| 29 | — | — | — |
| 30 | — | — | — |
| 31 | — | — | — |

TC = Too Conductive to measure
NR/I = No Reading as the material was too insulative to determine.

In the above examples, comparative examples 1 and 2 were found to be too conductive for application in a high strike voltage application. As noted, it is desired that upon application of a voltage such as 5,000 volts DC, thermoplastic composite materials that are nominally insulative at lower voltages, may exhibit a bulk volume resistivity of about $10^3$ $\Omega$-cm to $10^{10}$ $\Omega$-cm, which is then a dissipative or shielding material. The other examples are illustrative of the at least some of the breadth of the thermoplastic composite materials that can exhibit the desired properties. Other compositions will be evident to those of skill in the art based upon the described embodiments.

In some determinations referred to in the present application, standard specimens having a standard ASTM D3801 flame bar shape and dimensions of 6"×0.5"×0.125" were formed from the present thermoplastic composite material by injection molding. Other test specimens were injection molded into cylindrical tubes having three different nominal diameters: 0.75 inches, 2 inches, and 4 inches. Aluminum ferrules that conform to SAE AS5836-1-XX (flex) and SAE AS1656-1-XX (rigid) and finished with a chemical conversion coat per MIL-C-5541 were attached to the ends of the tubes via stub ACME threads. The overall length of each dielectric isolator cylindrical tube was 5.4 inches from the end of one ferrule to the end of the other ferrule.

Dielectric isolators, constructed as described above from aluminum ferrules and tubes of the present thermoplastic composite material, were tested for dielectric performance (pre-lightning test) by measuring the electrical resistance of the dielectric isolator from end to end at 500 VDC or greater (as high as 6000 VDC), with one test probe located on the outside surface of one ferrule and another test probe located on the other ferrule. As shown in FIG. 1, the test results show that a very large percentage of the dielectric isolators met the resistance requirements between $10^5\Omega$ and $10^8\Omega$. However, as indicated by the process variability bandwidth in the graph of FIG. 1, full coverage would not exist for 0.5 inch diameter isolators as well as 4 inch diameter isolators. To provide isolators which meet the electrical resistance requirements across the entire size matrix, different tube compositions with a slightly higher carbon fiber content (e.g., circa 4.2 wt %) or lower carbon fiber content (e.g., circa 3.8 wt %) may be employed. In other embodiments, the different tube compositions with slightly higher or lower carbon nanotube content may be employed to achieve desired electrical resistance properties for the thermoplastic composite material. Generally, increasing the carbon fiber content and/or carbon nanotube content in the composition will decrease the electrical resistance of the composite and isolators formed therefrom.

After completing the measurement of the electrical resistance of the dielectric isolators as described above at a single fixed voltage, the isolators were then exposed to simulated lightning events consisting of twelve voltage pulses, six in each polarity (positive and negative), having a peak amplitude of 9000 Volts that conform to voltage waveform B in accordance with SAE ARP5412. The testing was performed per SAE ARP5416 with one test probe located on the outside surface of one ferrule and another test probe located on the other ferrule. To pass the test, each isolator should not exhibit electrical arcing or sparking, either internally or externally, or voltage/current waveform collapse during and after exposure to the twelve voltage pulses. At the conclusion of the testing, all of the isolators passed the simulated lightning strike test as none of them exhibited an arc, spark, or waveform collapse.

Figure 2:
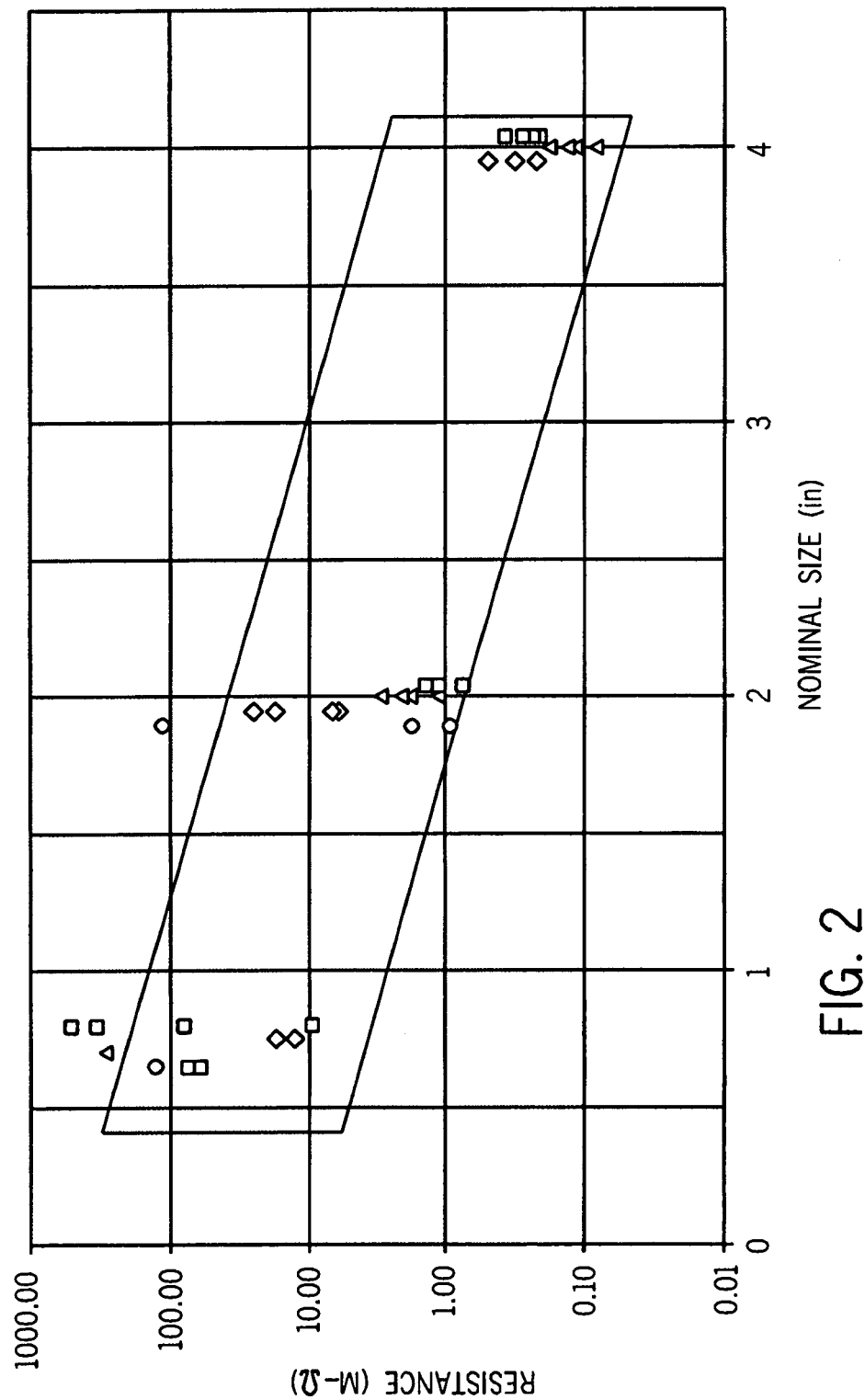
FIG. 2 is a graph of electrical resistance (y-axis) vs. tube diameter size (x-axis) for post-lightning strike testing of an exemplary tube composition.

Each dielectric isolator was then retested for dielectric performance (post-lightning test) by measuring the electrical resistance of the dielectric isolator from end to end at 500 VDC or greater (as high as 6000 VDC), with one test probe located on the outside surface of one of the ferrules and another test probe located on the other ferrule, to ensure that the electrical resistance was for each isolator was still between $10^5\Omega$ and $10^8\Omega$. As shown in FIG. 2, the test results show that a large percentage of the dielectric isolators met the resistance requirements of between $10^5\Omega$ and $10^8\Omega$ following the simulated lightning strike test.

One exemplary thermoplastic composite material includes, a thermoplastic organic polymer, a plurality of carbon nanotubes, and a plurality of carbon fibers, where the material exhibits a bulk volume resistivity of about $10^3$ $\Omega$-cm to $10^{10}$ $\Omega$-cm at 5,000 volts DC. In some embodiments, the thermoplastic, organic polymer used to form the composite materials may desirably have a viscosity of about 800 to 1,500 poise as measured at 380° C. and a shear rate of 1000 sec$^{-1}$. The thermoplastic composite material may include about 60 to 75 wt. % 4-(4-(4-oxyphenoxy)-phenoxy)-benzoyl polyetheretherketone as the thermoplastic organic polymer component. Some exemplary thermoplastic composite materials exhibit a bulk volume resistivity of no more than a 10× factor. In such materials, from about 60 to 75 wt % (commonly about 65 to 70 wt %) of the thermoplastic, organic polymer may be present, from about 0.2 to 0.5 wt % (commonly about 0.3 to 0.4 wt %) of the carbon nanotubes may be present, from about 15 to 40 wt % (commonly about 20 to 30 wt %) of the glass fiber may be present; and from about 2 to 7 wt % (commonly about 3 to 6 wt %) of the carbon fibers may be present. In some embodiments, the thermoplastic composite material may exhibit a bulk volume resistivity of about $10^5$ $\Omega$-cm to $10^8$ $\Omega$-cm at 500 volts DC. In some embodiments, the thermoplastic composite material may exhibit a bulk volume resistivity of about $10^6$ $\Omega$-cm to $10^{10}$ $\Omega$-cm at 5,000 volts DC, and optionally, the thermoplastic composite material may exhibit a bulk volume resistivity degradation of no more than a 10× factor. In such materials, the thermoplastic composite material may exhibit a bulk volume resistivity of at least about $10^6$ $\Omega$-cm at 100 volts DC. In other embodiments, the thermoplastic composite material may exhibit a bulk volume resistivity of at least about $10^8$ $\Omega$-cm at 100 volts DC, or, desirably, at least about $10^9$ $\Omega$-cm at 100 volts DC.

The word "or" when used without a preceding "either" (or other similar language indicating that "or" is unequivocally meant to be exclusive—e.g., only one of x or y, etc.) shall be interpreted to be inclusive, that is "or" when it appears alone shall mean both "and" and "or." Likewise, as used herein, the term "and/or" shall also be interpreted to be inclusive in that the term shall mean both "and" and "or." In situations where "and/or" or "or" are used as a conjunction for a group of three or more items, the group should be interpreted to include one item alone, all of the items together, or any combination or number of the items. For the purposes of this disclosure and unless otherwise specified, "a" or "an" means "one or more."

Terms used in the specification and claims such as have, having, include, and including should be construed to be synonymous with the terms comprise and comprising.

As used herein, "about" will be understood by persons of ordinary skill in the art and will vary to some extent depending upon the context in which it is used. If there are uses of the term which are not clear to persons of ordinary skill in the art, given the context in which it is used, "about" will mean up to plus or minus 10% of the particular term. From about X to Y is intended to mean from about X to about Y, where X and Y are the specified values.

One skilled in the art will readily realize that all ranges discussed can and do necessarily also describe all subranges therein for all purposes and that all such subranges also form part and parcel of this invention. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc.

While several, non-limiting examples have been illustrated and described, it should be understood that changes and modifications can be made therein in accordance with ordinary skill in the art without departing from the invention in its broader aspects as defined in the following claims.

What is claimed is:

1. A thermoplastic composite material comprising:
   about 50 to 98 wt % thermoplastic, organic polymer;
   about 0.2 to 0.5 wt % carbon nanotubes; and
   about 2 to 7 wt % of carbon fibers;
   wherein the thermoplastic composite material exhibits a bulk volume resistivity of about $10^3$ $\Omega$-cm to $10^{10}$ $\Omega$-cm at 5,000 volts DC; and has a five-strike bulk volume resistivity degradation of no more than a 20× factor at 5,000 volts; and
   the thermoplastic polymer includes polyetheretherketone, which is an aromatic polyetherketone.

2. A thermoplastic composite material comprising:
   about 50 to 98 wt % thermoplastic, organic polymer;

about 0.2 to 0.5 wt % carbon nanotubes; and
about 2 to 7 wt % of carbon fibers;
wherein the thermoplastic polymer is 4-(4-phenoxyphenoxy)benzoyl polyetheretherketone; and the thermoplastic composite material exhibits a bulk volume resistivity of about $10^3$ Ω-cm to $10^{10}$ Ω-cm at 5,000 volts DC; and has a five-strike bulk volume resistivity degradation of no more than a 20× factor at 5,000 volts.

3. The thermoplastic composite material of claim 1, wherein the carbon nanotubes are single-wall carbon nanotubes, multi-wall carbon nanotubes, or a mixture thereof.

4. A thermoplastic composite material comprising:
about 50 to 98 wt % thermoplastic, organic polymer;
about 0.2 to 0.5 wt % carbon nanotubes; and
about 3 to 6 wt % carbon fibers, wherein the carbon fibers comprise milled carbon fibers and the milled carbon fibers have an average length of no more than about 0.5 mm;
wherein the thermoplastic composite material exhibits a bulk volume resistivity of about $10^3$ Ω-cm to $10^{10}$ Ω-cm at 5,000 volts DC; and has a five-strike bulk volume resistivity degradation of no more than a 20× factor at 5,000 volts.

5. The thermoplastic composite of claim 4, wherein the material comprises about 60 to 75 wt. % 4-(4-(4-oxyphenoxy)-phenoxy)-benzoyl polyetheretherketone; about 0.2 to 0.4 wt % of the carbon nanotubes; and further comprises about 15 to 40 wt % glass fiber.

6. The thermoplastic composite material of claim 5 wherein the carbon fibers are milled carbon fibers having an average fiber length of no more than about 0.3 mm.

7. The thermoplastic composite material of claim 1, wherein the thermoplastic composite material further comprises glass fibers and exhibits a bulk volume resistivity of at least about $10^5$ Ω-cm at 500 volts DC; the carbon fibers are milled carbon fibers having an average fiber length of no more than about 0.3 mm; and the thermoplastic composite material includes:
about 60 to 75 wt % 4-(4-(4-oxyphenoxy)-phenoxy)-benzoyl polyetheretherketone;
about 0.2 to 0.4 wt % of the carbon nanotubes;
about 3 to 6 wt % of the milled carbon fibers; and
about 20 to 30 wt % of the glass fibers.

* * * * *